Dec. 10, 1935.   W. E. HIGGINBOTTOM   2,023,682
METHOD OF CLOSING BAGS
Filed June 9, 1933   7 Sheets-Sheet 5

INVENTOR.
William E. Higginbottom
BY
Cornelius D. Ehret
his ATTORNEY.

Dec. 10, 1935.  W. E. HIGGINBOTTOM  2,023,682
METHOD OF CLOSING BAGS
Filed June 9, 1933  7 Sheets-Sheet 6

INVENTOR.
William E. Higginbottom
BY
Cornelius D. Ehret
his ATTORNEY.

Patented Dec. 10, 1935

2,023,682

UNITED STATES PATENT OFFICE 2,023,682

METHOD OF CLOSING BAGS

William E. Higginbottom, Haverford Township, Montgomery County, Pa., assignor to Benjamin C. Betner Company, Devon, Pa., a corporation of Delaware Application June 9, 1933, Serial No. 675,046

7 Claims. (Cl. 93—6)

My invention relates to methods of closing bags, particularly of the type using fastening clips, or equivalent.

In accordance with one aspect of my invention a bag is scored for folding or rolling down of the open end forming the top of the bag and to provide a score line circumscribing it at the level of the bag contents to permit squaring-off of the closed top and to obtain a firm package; more particularly, and in accordance with a preferred method, the bags after receiving their contents are scored individually in accordance with level of the contents.

More particularly, my invention also comprehends creasing the ends of the bag to define triangular panels which are folded substantially into the plane of the closed bag top; the aforesaid circumscribing score line and the score lines defining said triangular panels cooperating to avoid bunching of the bag material during the rolling down of the open end and squaring off of the top formed thereby.

Also in accordance with one form of my invention, the filled bags are transported along a path, and at successive stations along the path, the bags in succession are subjected to the several steps of closing them, as scoring, collapsing of the open end, trimming, folding, fastener application, squaring, etc.

My invention also resides in the novel features hereinafter described and claimed.

For an understanding of my invention and for illustration thereof, reference is to be had to the accompanying drawings, in which, in perspective:—

Figure 1:
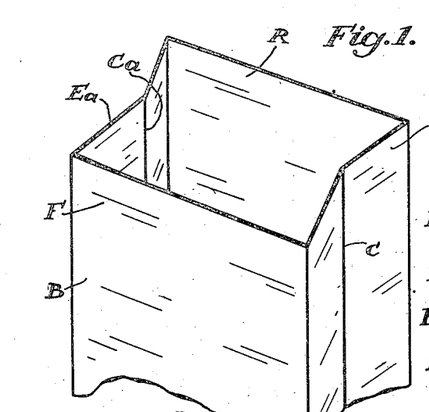
Fig. 1 illustrates the open mouth of a bag.

Referring to Fig. 1, for convenience of explanation the front face of the bag B is designated by the reference character F, the rear face by the reference character R, the left and right ends by the reference characters Ea and E respectively. The folds or creases C, Ca which result from the bag having been folded flat, divide the end faces into two vertical panels of equal width.

Figure 2:
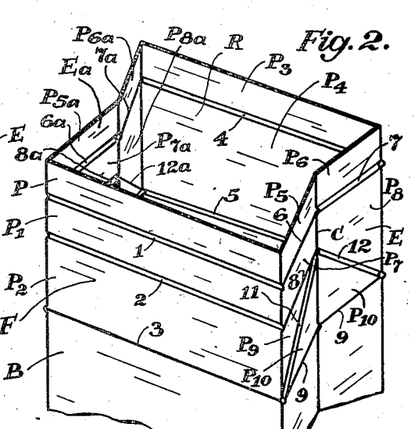
Fig. 2 is the same as Fig. 1 with addition of scoring or creasing.

Referring to Fig. 2 the front face F is divided by the scores of creases 1, 2 and 3, into two upper panels P, and P1 of substantially equal width, and a third lower panel P2, whose height or width corresponds substantially to half the width of the bag, i. e., half the distance between the front and rear faces of the bag when extended. The two upper scores, 1 and 2, as indicated by the pair of parallel lines, are formed by indenting from the front face inwardly, whereas the third or bottom score 3, as indicated by a single line, is formed to project slightly from the front panel F. The rear panel R is divided into the upper panel P3, corresponding substantially to panel P of the front face, and panel P4 whose height or width corresponds substantially to the combined width of the panels P1 and P2 of the front face F. The scores or creases 4 and 5 which form these two panels both extend outwardly from the rear surface of face R. The panel P5 of end face E is defined by the vertical crease C, and the outwardly projecting scoring 6, and corresponding panel P5a, the end face Ea is formed by the scoring Ca, and the crease 6a. Similarly the panels P6, and P6a, of the two end panels are formed by the scoring 7, 7a, which, unlike scoring 6, 6a forms a depression as viewed from the outside of the bag. These panels P5, P5a, P6, and P6a are all of width corresponding substantially to the panels P and P3. In fact, the top of the bag is circumscribed by the scoring 1, 6, 7, 4, 7a, and 6a. The panels P7 and P7a, below the panels P5 and P5a, are formed by the addition of the scoring 8, 8a, which projects outwardly. Additional creases or lines may be used or some omitted in keeping with the requirements for different thicknesses, plies and properties of the bag material. There are no corresponding rectangular panels below the panels P6, and P6a; or otherwise expressed, the scoring 2, 8, 8a extends only half way around the bag. The scoring 9, on end face E and corresponding scoring on end Ea, not shown, is in fact a continuation of scoring 3 and 5, so that what ultimately is to be the top of the closed bag is circumscribed by outwardly extending creasing or scoring. The depressed scoring or creasing 11 and 12 forms a triangular panel P10 having the scoring 9 as its base, and having its apex at the junction between scoring 8 and crease C, viz. the altitude of the triangle P—10 as measured on line C is substantially equal to one-half the width of bag face E. There is a corresponding and similar triangular panel at end Ea of the bag.

Figures 3, 4, 5, 6:
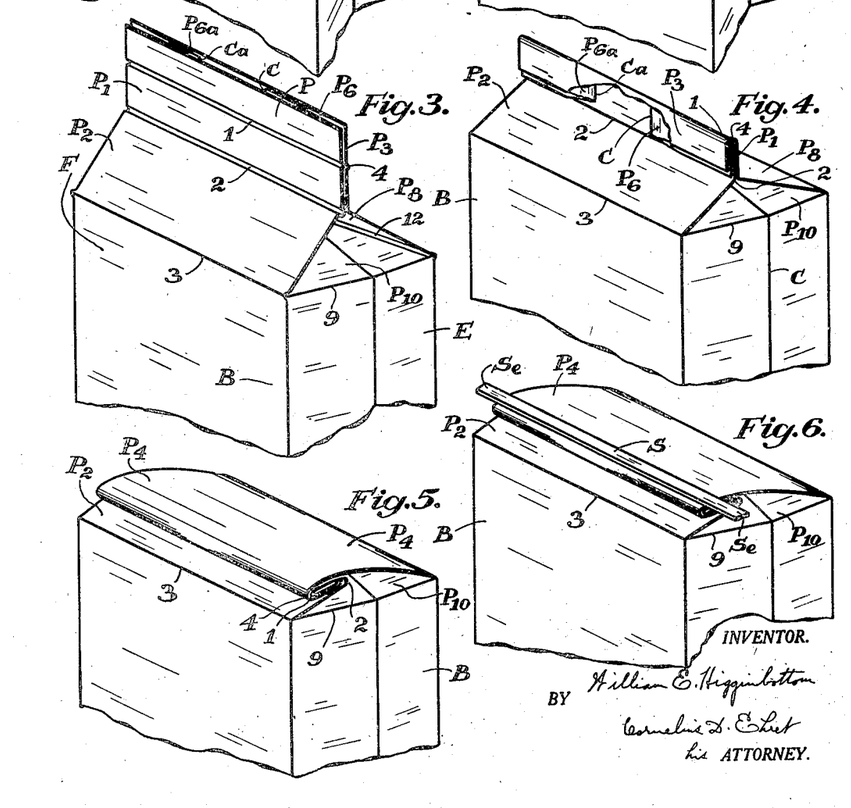
Figs. 3 to 5 illustrate successive folding steps.
Fig. 6 illustrates the application of a flexible fastening strip to the folded bag top.

To close the bag, the ends E, Ea are tucked in and the front F and rear R of the bag brought together above the scoring 2. Panels P5 and P6 come together between panels P and P3 at one end of the bag and similarly panels P5a and P6a are folded together between P and P3 at the other end of the bag. Panels P7, and P7a, swing into engagement with the inside face of panel P1. As indicated the score line 1 of face F and score line 4 of rear face R nest with score lines 6 and 7, and score lines 8 and 8a nest with score line 2. Furthermore, the outwardly extending score line 9, and inwardly directed scoring 11, 12 facilitates the turning in of triangular panels P10, P10a and allows panels P8, P9 to swing toward engagement with panels P4 and P2 respectively.

The closed top of the bag formed by panels P, P3, and end panels P5, P6, P5a, and P6a between them, is bent forwardly to the position of Fig. 4, bringing panels P and P1 into face to face engagement. This folding or bending is greatly facilitated by the scoring 1, 6, 7, 4, 7a and 6a, all of which is now in such relation as to facilitate folding of the many thicknesses of paper in this direction. In all cases the line of folding is clearly or sharply defined by scoring or creasing, whereas in the absence of such provision, the folding would occur haphazardly and cause undesirable bunching of the paper in some regions. Score lines 2, 9, 9a, 11, 11a, 12 and 12a are particularly of assistance in collapsing or folding the walls F, R, E, and Ea to the position of Fig. 3. Especially when the folding is effected mechanically, the need for the score marks is greater the nearer the level of the bag contents is to the top of the bag.

Figure 7:
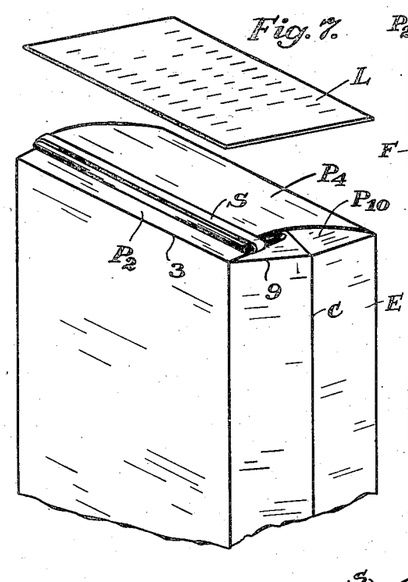
Fig. 7 illustrates application of a label.

The rolling down of the top is continued by bringing the panel P3 into face to face engagement with panel P2, so that the various panels take the position shown in Fig. 5. For holding the bag closed, there is applied a flexible fastening strip S, having ends Se extending beyond the ends of the bag. This strip may be of a covered metal strip, per se old, or may preferably be of the type shown in my application Serial No. 641,718, filed November 8, 1932, in which the flexible element is thin wire bent to form looped ends which are retained in position by the paper covering. The ends of the fastening device S are turned inwardly, as shown in Fig. 7 to clamp the folded panels together. The bag can be opened at any time by straightening the ends and unrolling the bag top. If less than all the contents are used, the bag top may be re-closed by again rolling it down and applying the fastening, the aforesaid creasing or folding facilitating closing the bag.

Preferably, as indicated in Fig. 7, the filled bag, after it is initially closed, is sealed by application of a label L, which may be plain, or upon which there may appear suitable printing. The label is adhesively applied to the panel P4 and is preferably of such extent that the forward part of the label is adhesively applied to the exposed part of panel P2, so that for this modification, the completed bag assumes the appearance shown in Fig. 8. The label, it should be noted, attaches the fastening strip S to the panel P4. If the label is not used, strip S should be adhesively secured to panel P4. To open the bag, the label L may be suitably cut or torn, as by severing it along the dotted line X, whereupon after straightening of the fastening strip, the bag may be opened, and thereafter opened and closed as many times as desired. Bending of the strip S, in each case holds the folded panels of the bag in bag closing position.

Figure 8:
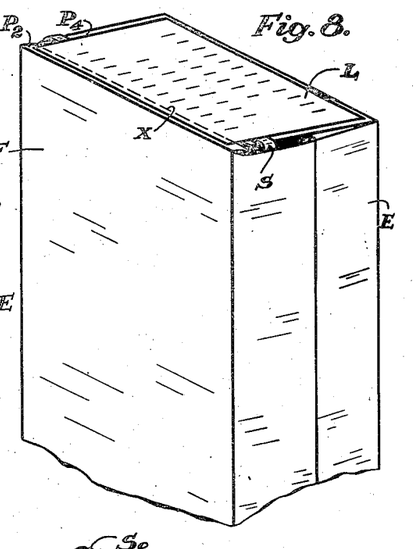
Fig. 8 illustrates the completed bag.

Score marks 3, 5, 9 and 9a aid in obtaining neat and even folding, and are particularly useful in squaring-off the bag top, as shown in Fig. 8.

The aforesaid steps of creasing and folding the bag may be effected manually, or preferably they may be performed automatically, and as successive steps of an automatic bag closing operation. For example, referring to Fig. 9, the bags as delivered from a weighing and filling machine are brought by the conveyor 10 against a stop 11 adjacent the conveyor 12 which, as indicated, may consist of chains 13, 14 provided with a plurality of pocket devices 15 extending between the chains, and movable thereby to the successive stations hereinafter described. When one of the three-sided pockets is adjacent the stop 11, a bag is pushed from conveyor 10 into the pocket 15 or equivalent by a suitable transfer device, for example a plunger operating in timed relation to the intermittent movement of the conveyor. The guide bar 16 limits the forward position of the bag. The filled bag is moved by the conveyor to station #1 at which the pocket is vibrated to shake down the contents of the bag so that the upper level falls, as indicated by the decreased height of the dotted line 17. The shaking may be effected by any suitable mechanism, for example by the arrangement generically illustrated in Fig. 9a, in which the cam 18 vibrates the arm 19 connected to the bottom plate 20 of the pocket 15. The slots 21 in the bracket 22 of the pocket permits this vertical movement.

Figures 9, 9A, 9B:
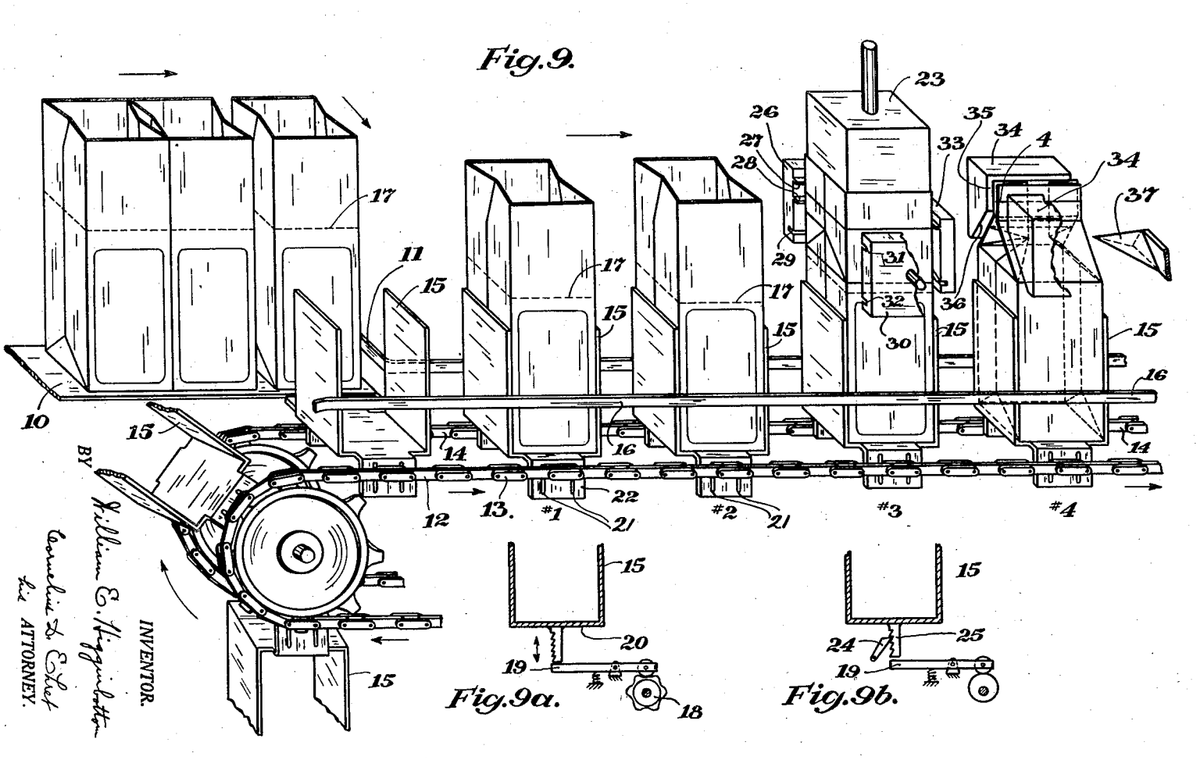
Figs. 9 and 10 illustrate the progressive steps of closing bags, at successive stations.
Figs. 9a to 9b are referred to in explanation of the steps of Figs. 9 and 10.

Each bag in turn is moved to station #2 where further settling is effected by vibration of the pocket. Any suitable mechanism may be used, for example, such as shown in Fig. 9a. The decreased height of the level is shown by dotted line 17. At the third station, the plunger 23 is moved downwardly through the open mouth of the bag to a predetermined position. The pocket with the filled bag is moved upwardly, as for example by mechanism generally of the type shown in Fig. 9b, until the bottom of the plunger is engaged by the bag contents. The pocket is held in this elevated position, as by the pawl 24 engaging teeth of the bar 25. As the particular mechanism is not part of the present invention, constructional details are omitted for clarity. While the bag is in this position four dies, one for each face of the bag, move toward the block 23 to score the bag, generally, and preferably as previously described in connection with Fig. 2. Briefly, the die 26 has the projections 27 and 28 for forming the depressed scoring 1 and 2 of the front of the bag, and the groove 29 which co-operates with a projection on the opposite face of the block 23, to form the projecting scoring 3. The die 30 is provided with grooves 31, 32, which cooperate with projections on the block 23 to form the scoring 4 and 5. Similarly, dies 33, only one of which is shown for clarity, are provided with suitable grooves and projections to form the scoring for the end faces E and Ea of the bag.

It should be noted that the location of the scoring determining the ultimate top of the bag, i. e., the scoring 3, 9, and 5, is determined by the level of the bag contents and is not arbitrarily located on the bag, so that as between different bags, there may be more or less difference in height from time to time, because of, for example, change in density of the material due to atmospheric changes, differences in processing such as grinding, roasting, weighing, etc.

After the dies and block 23 are withdrawn, the pocket and bag, still in elevated position, move to station #4, at which the blocks 34 having the parallel faces 35 and inclined faces 36 move together to bring the various panels of the bag in the position shown in Fig. 3. The tucking tools 37 fold in the panels P5, P6, P5a and P6a, and in general move all of the panels P5 to P10, and P5a to P10a of ends E and Ea, generally to the position shown in Fig. 3. As the position of the scoring is determined by the bag contents, there may be more or less excess bag material, i. e., the panels P and P3 may be wider than necessary. Therefore before the folding shown in Fig. 4, is effected, the excess material is cut from the top, this ring W of excess paper may be removed, at station #4, or as indicated may be cut from the bag upon arrival at station #5 at which the bag is still in elevated position. It is preferred that after this trimming the distance between the trimmed top and the score marks 1 (and 4) be slightly greater than the distance between score marks 1 and 2. This ensures that the top edges shall be clamped or wedged in the fold along score mark 2 which is of material aid in preventing the sifting out from the completely closed bag, of finely ground or powdered materials as pulverized coffee, flour, sugar, etc. When desired, adhesive, or gum, preferably a so-called pressure-sensitive adhesive, may be disposed along or in the region of score mark 2 to increase the effectiveness of the seal.

At station #5 the top of the bag is rolled down, performing the steps generally shown by Figs. 4 and 5, and at the next station, #6, the bag fastener, for example, paper covered metal strip cut from the roll 38 or removed from a stack or magazine is applied and bent to holding position.

Figures 10, 11:
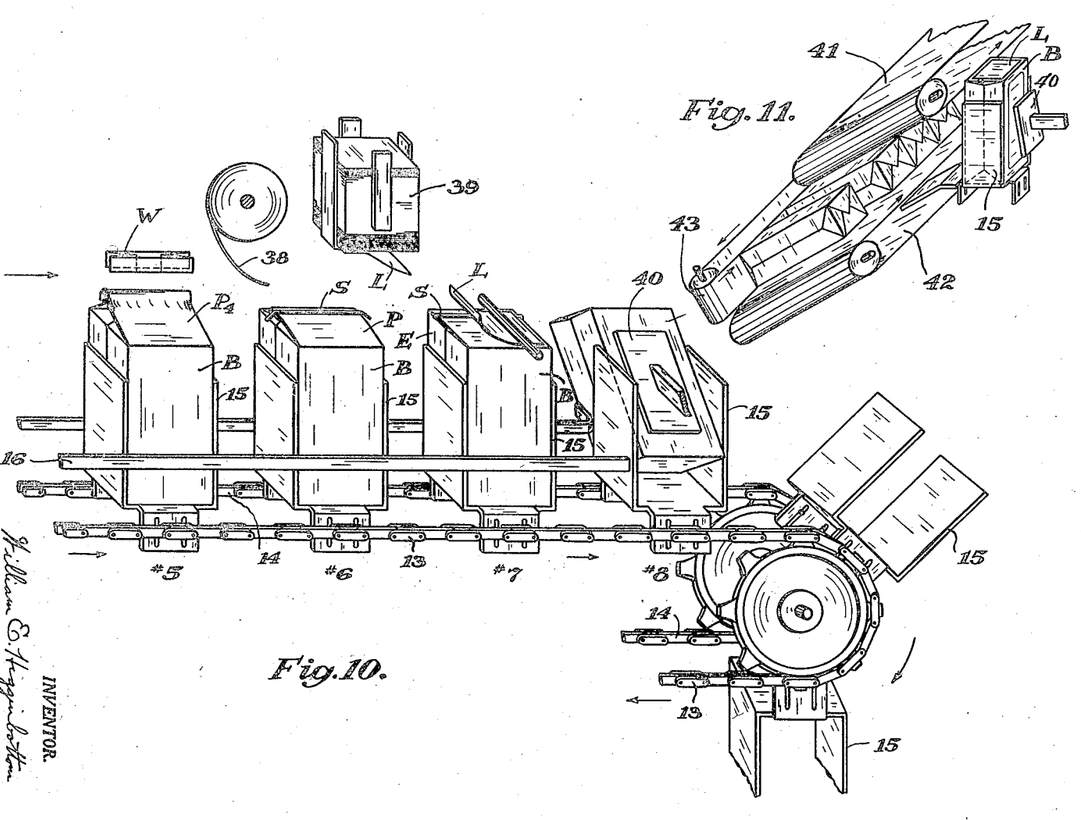
Fig. 11 illustrates conveying mechanism for transporting the completed bags.

At station #7, a label L, removed from a stack 39 thereof or cut from a roll, is adhesively applied, completing the bag. At station #8, the bag is pushed from the pocket 15, as by the plunger 40, onto belts 42 and 43 which carry it between conveyor belts 41 and 42, the spacing between which corresponds to the desired width of the completed bag. During the preceding operations the contents of the bag tend to settle rather compactly and effect bulging of the bag. This condition is remedied and the bag walls and top brought to a substantially rectangular condition or squared-off by the belts 41, 42. The scoring 3, 5, 9, and 9a form the top edges of the bag and facilitate the squaring-off. The packages formed by the filled bags are firm, tightly wrapped, and the ends are substantially squared, enhancing their shelf appearance and facilitating handling and shipping.

The belt 43 engages the top of the bag, and assists in holding the label during seasoning of the glue.

As previously stated, the height of each bag is actually determined by the volume of its contents so that each of the bags as delivered by the belts is in effect a firm package, whereas if the top of the bag were arbitrarily determined by pre-scoring it, which scoring would have to be positioned to accommodate the maximum volume, some of the bags would have an appreciable empty space at their tops which is undesirable both from the aspect of appearance as well as packing.

Figure 15:
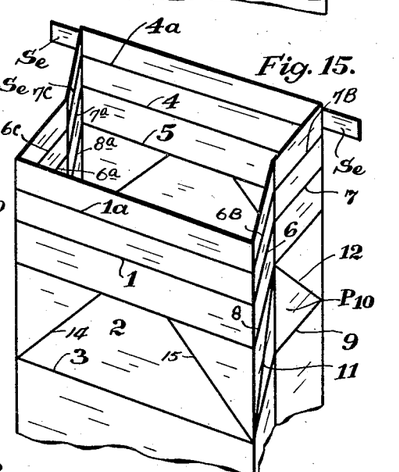

Prescored bags may be used and firm packages obtained if they are all filled to the correct height, in which event, the scoring stage #3, and trimming stage #5 may be omitted. Preferably, the pre-scoring is effected while the bag is flat or collapsed as all score lines can be made by a single die. As evident from Figs. 12 and 15, the die elements forming score 1 concurrently produce scores 4, 6, 7, 6a and 7a; score marks 8, 8a are produced by the same die element forming score line 2, etc. The creasing 14, 15 forms the score lines 11, 12, 11a, 12a defining the triangular panels P10, P10a.

The bag illustrated in Figs. 12 to 19 has an additional fold in the rolled-down top which is provided by the creasing 1a, 4a, 6B, 7B, 6C, 7C. As indicated by Figs. 16 to 19, the fastener strip S may be applied to panel Pa and is wound into the folded end as it is rolled down. As previously described, the panels defined by the scoring, are brought into overlying relation and the ends Se of the fastener strip turned in to clamp the ends of the fold, Fig. 19.

Figure 18:
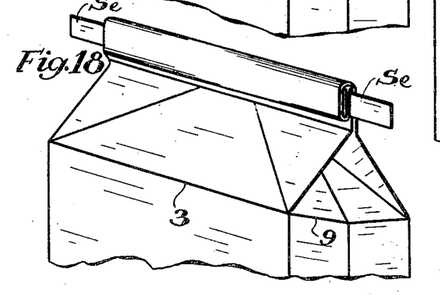
Figure 19:
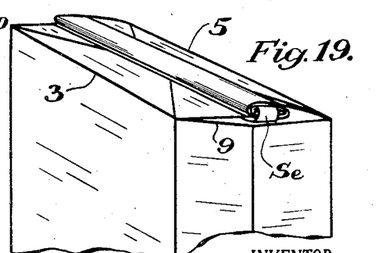
Figure 19A:
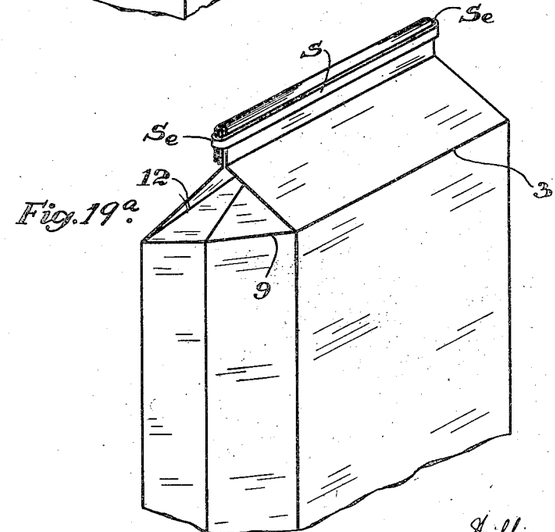
Fig. 19a illustrates an alternative mode of applying a fastener strip or clip.

If desired, the closed end instead of being flattened against the bag top as in Fig. 19, may remain erect, as in Fig. 18, and the end Se of strip S bent backwardly; or as indicated in Fig. 19a, the strip S may be applied to the erect rolled-down end after the rolling down has been completed to embrace all of the folds. In any of the modifications, a label may be applied to overlie the rolled down top and fastener as previously described.

Figures 20, 21, 22, 23:
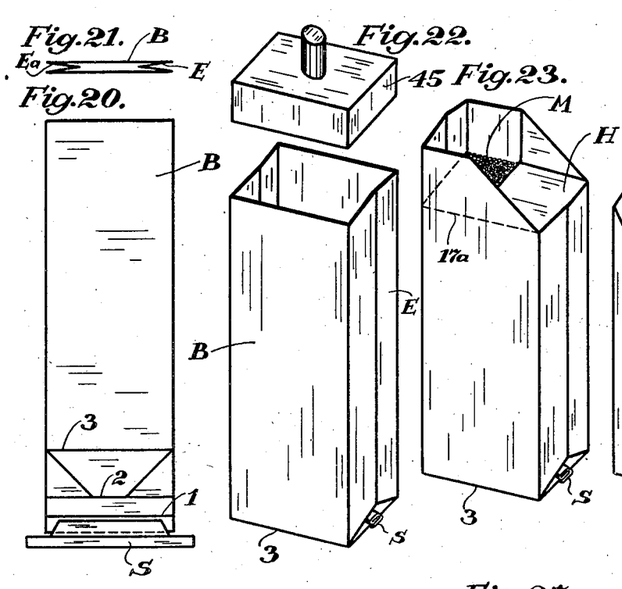
Figs. 20 to 28 illustrate another method of using a creased bag to obtain a firm package.

A method of obtaining a firm package with prescored bags is illustrated in Figs. 20 to 28. The bag shown in Fig. 20 is open at both ends, i. e. it is in the form of a tube as more clearly appears in the plan view in Fig. 21. The scoring may be effected while the bag is collapsed, as in Fig. 12, or it may be distended and only the score lines actually used impressed on each face, as at station 3 of Fig. 9, or generally as appears in Fig. 29. The top of the bag is rolled-down and a fastener applied. The collapsed bag is distended as by plunger or block 45 for reception of its contents. After removal of the block, the desired weight of material is passed through the open bottom of the bag in which it assumes a level determined by the existing conditions of humidity, temperature, processing, etc. The open bottom of the bag may be closed and permanently sealed in any desired manner, the folding being such that the contents are snugly held in the bag, and in fact comprise the form for folding. Therefore, although the bags before filling may be identical, the filled bags may vary in height, for example as much as two inches for pound bags of coffee. All bags will present a firm appearance because each is individually formed about or fitted to its contents.

A preferred method of closing the open bottom is shown by Figs. 23 to 27. Referring to Fig. 20, the material M, for example coffee, has assumed a level 17a which as above stated may be different for different bags for the same weight of contents. One side of the bag is turned down against the top of the material, the overlap of the turned down flap H therefore varying in accordance with level 17, i. e., the material itself is a form determining the line along which the flap H is bent.

Figure 24:
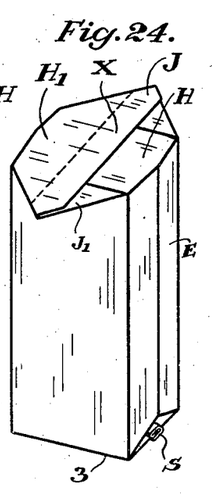
Figure 25:
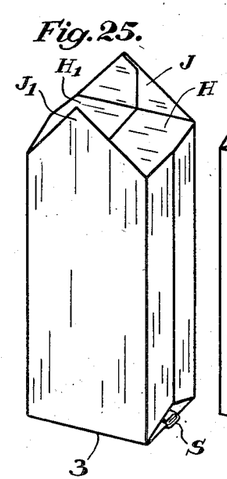
Figure 26:
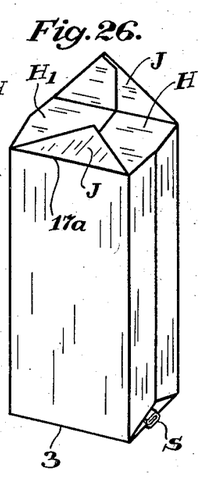
Figure 27:
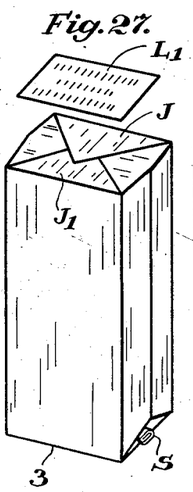
Figure 28:
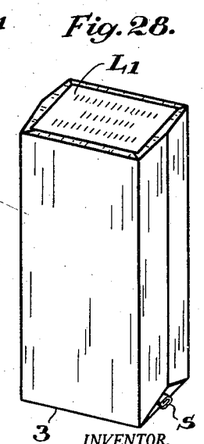
Figure 29:
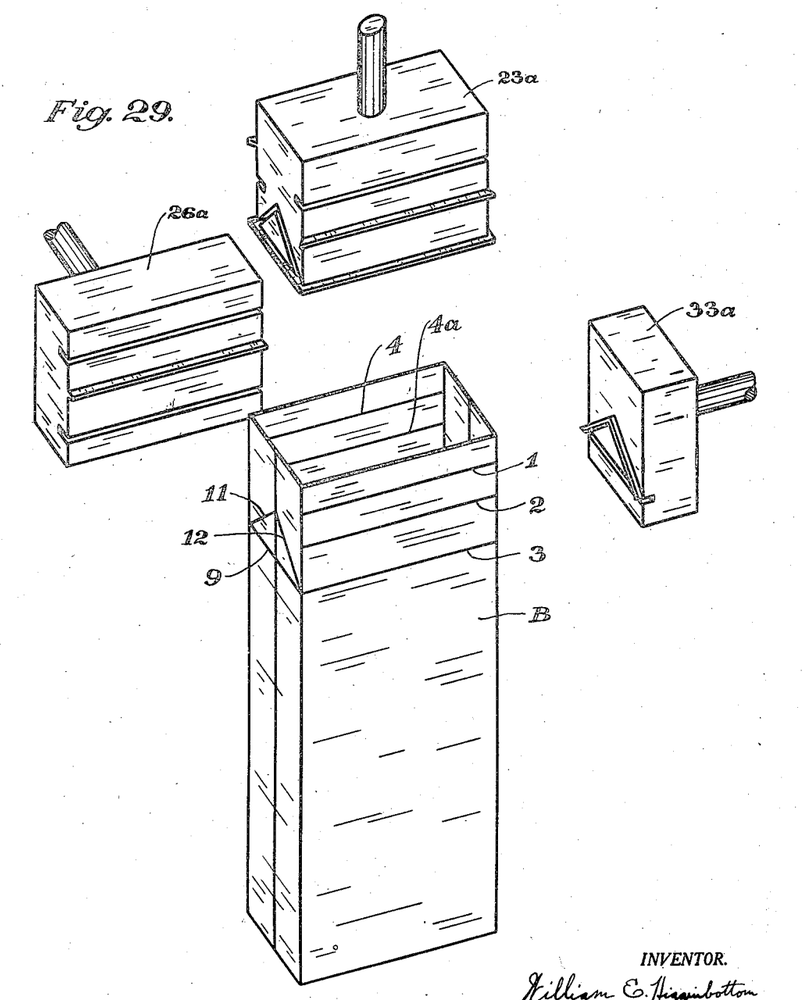
Fig. 29 illustrates formation of a creased bag.

Thereafter the front, rear and opposite side walls are folded to the position shown by Fig. 24, and preferably adhesive is applied along the region X to seal the bottom of the bag by adhesively securing the overlapping bag material. This folding forms two triangular flaps J, Jl extending at right angles from the front and rear of the bag, which, as indicated by Figs. 25 to 27, are turned into overlying engagement with the bottom of the bag formed by flaps H and H'. Flaps J and Jl may be held in position by suitable application of adhesive, and/or by application of a label L', Fig. 27, which secures the flap J, Jl to each other and to bottom panels H, Hl. The completed bag shown in Fig. 28, is substantially rectangular and firm, facilitating packing and affording enhanced shelf appearance.

For removing the bag contents, the ends Se of clip S are bent outwardly and the top of the bag unrolled. If only part of the contents are used, the remainder may be preserved for subsequent use by re-rolling the top of the bag and again bending the ends of clip 8 to clamp the rolled-down end.

Figures 12, 13, 16, 17:
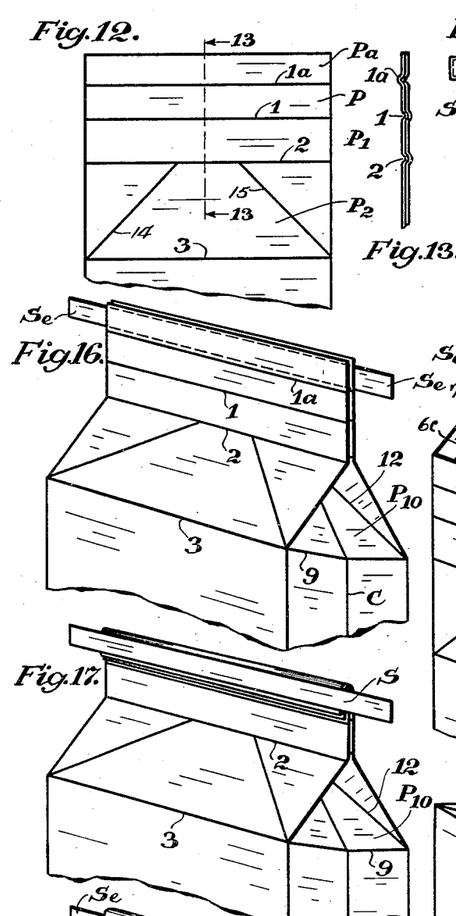
Figs. 12 to 19 illustrate another creased bag and the successive folding steps for closing it.
Figure 14:
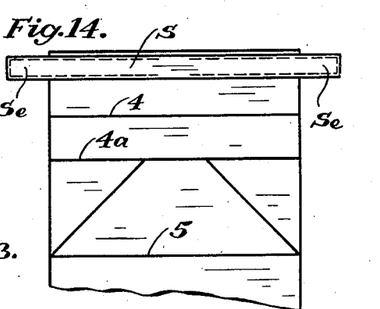

It is not necessary that the creasing or scoring be effected while the bag is collapsed as in Fig. 12. The mouth of the bag may be held open as by plunger 23a, Fig. 29, preferably provided with grooves and/or projections which cooperate with projections and/or grooves of the dies 26a, 33a etc., when moved into engagement with the bag, to form the desired score lines.

The scoring or creasing is of advantage whether the bag closing operations be effected manually or mechanically, especially the latter. The scoring dies can be incorporated in a machine for making bags, or in a machine for filling and/or closing bags.

While I have illustrated and described various forms of my invention, it is to be understood that my invention is not limited thereto but is coextensive in scope with the appended claims.

What I claim is:

1. The method of closing a bag which comprises rolling down the open end thereof, thereafter applying an elongated flexible fastening strip and bending the ends thereof releasably to clamp the ends of the rolled down end in bag-closing position, and thereafter adhesively applying sheet material to join said strip to said rolled down end.

2. The method of closing a filled bag which comprises creasing the open end of the bag at a distance from its bottom determined by the level of the bag contents to form parallel panels, trimming the top edge of the bag to a predetermined height above said level, thereafter rolling down the open end of the bag to effect overlying relation of said parallel panels, and applying securing means to hold the rolled down end in bag-closing position.

3. The method of closing a filled bag which comprises creasing the open end of the bag at a distance from its bottom determined by the level of the bag contents to form parallel panels, thereafter rolling down the open end of the bag to effect overlying relation of said panels, bringing a flexible fastener into engagement with the rolled down end, and bending the ends of said fastener to clamp the ends of the overlying panels in bag-closing position.

4. The method of closing a filled bag which comprises creasing the open end of the bag at a distance from its bottom determined by the level of the bag contents to form parallel panels, thereafter rolling down the open end of the bag to effect overlying relation of said panels, applying a fastener strip and bending its ends to clamp the overlying panels in bag closing position, and applying sheet material to overlie and join the fastener strip and the top of the bag.

5. The method of closing a filled bag which comprises closing the mouth of the bag, thereafter trimming off the top edge to a predetermined height above the level of the bag contents, rolling down the top of the bag, and applying securing means to hold the rolled down top in bag-closing position.

6. The method of closing a filled bag which comprises creasing the open end of the bag at a distance from its bottom determined by the level of its contents to form panels, closing the mouth of the bag by bringing the uppermost panels into substantially the same plane, thereafter trimming off the top edge of the bag to a predetermined height above said level, thereafter rolling down the top of the bag to bring said panels into overlying relation with lower panels, and applying and bending a fastener strip to clamp the rolled down top in bag-closing position.

7. The method of closing filled bags which comprises moving them along a path, at a region in said path rolling down the open ends of the bags in succession, and at a subsequent region in said path attaching flexible fasteners to the bags in succession for holding the rolled-down ends in bag closing position.

WILLIAM E. HIGGINBOTTOM.